United States Patent [19]

Suzuki

[11] Patent Number: 5,168,080
[45] Date of Patent: Dec. 1, 1992

[54] METHOD OF MANUFACTURING COMPOSITE CERAMICS OF SILICON NITRIDE AND ZIRCONIA

[75] Inventor: Shogo Suzuki, Yamato, Japan

[73] Assignee: Isuzu Ceramics Research Institute Co., Ltd., Fujisawa, Japan

[21] Appl. No.: 713,559

[22] Filed: Jun. 10, 1991

Related U.S. Application Data

[63] Continuation-in-part of Ser. No. 522,059, May 11, 1990, abandoned.

[30] Foreign Application Priority Data

May 11, 1989 [JP] Japan .................................. 1-118473

[51] Int. Cl.⁵ ............................................. C04B 35/58
[52] U.S. Cl. ..................................... 501/97; 501/103; 501/98; 264/65
[58] Field of Search ................. 501/97, 98, 103, 104, 501/105; 264/65

[56] References Cited

U.S. PATENT DOCUMENTS

| | | | |
|---|---|---|---|
| 4,640,902 | 2/1987 | Lange | 501/98 X |
| 4,716,133 | 12/1987 | Horiuchi et al. | 501/97 |
| 4,769,350 | 9/1988 | Nishioka et al. | 501/98 |
| 4,801,565 | 1/1989 | Matsui | 501/98 |
| 4,820,665 | 4/1989 | Ukai et al. | 501/98 X |
| 4,946,630 | 8/1990 | Ezis | 501/97 X |

FOREIGN PATENT DOCUMENTS

WO87/06928  11/1987  European Pat. Off. .

OTHER PUBLICATIONS

*CRC Handbook*, Physical Constants of Inorganic Compounds, pp. B-218, B-241.
Chemical Abstracts, vol. 100, No. 16, Apr. 1984, "Silicon Nitride-Based Sinters" & JP-A-58213677, p. 286.
F. L. Riley Ed., "Process in Nitrogen Ceramics", 1983, Martinus Nijhoff Publishers, p. 262.
I. J. McColm "Ceramic Science for Materials Technologists", 1983, Leonard Hill, p. 279.
Chemical Abstracts, vol. 102, No. 20, May 1985, "Manufacture of High-Strength Silicon Sintered Bodies" & JP-A-59223,274, p. 299.

*Primary Examiner*—Karl Group
*Attorney, Agent, or Firm*—Staas & Halsey

[57] ABSTRACT

A composite ceramic material includes a matrix of ceramic particles and particles of a different ceramic having a lower sintering temperature than that of the matrix ceramic, the particles of the different ceramic being dispersed in the matrix of ceramic particles. According to a method of manufacturing such a composite ceramic material, material particles of one of the elements of a matrix ceramic and particles of a disperse ceramic whose sintering temperature is lower than that of the matrix ceramic are mixed together, and the mixture is pressed into a preliminary shaped body. Then, the preliminary shaped body is placed in a sinter reaction furnace, and the particles in the preliminary shaped body are subjected to sinter reaction in the sinter reaction furnace, thereby producing a preliminary sintered body in which the particles of the lower sintering temperature are dispersed in the matrix ceramic which is generated by the sinter reaction. Thereafter, the preliminary sintered body is fully sintered to make its structure dense, thereby producing a composite ceramic.

7 Claims, 2 Drawing Sheets

FIG. 4

| SPECIMEN | THREE-POINT BENDING STRENGTH (MPa) | THERMAL CONDUCTIVITY (cal/cm·sec·°C) |
|---|---|---|
| A | 800 | 0.02 |
| B | 350 | 0.04 |
| C | 600 | 0.05 |

METHOD OF MANUFACTURING COMPOSITE CERAMICS OF SILICON NITRIDE AND ZIRCONIA

This application is a continuation-in-part of application No. 07/522,059, filed May. 11, 1990, now abandoned.

BACKGROUND OF THE INVENTION

1. Field of the Invention

The present invention relates to a composite ceramic material which comprises a matrix of ceramic particles and particles of a different ceramic having a lower sintering temperature than that of the matrix ceramic, the particles of the different ceramic being dispersed in the matrix of ceramic particles, and a method of manufacturing such a composite ceramic material.

2. Description of the Prior Art

As is well known in the art, powders of two or more different ceramics may be mixed and sintered at different sintering temperatures, thereby producing a complex ceramic which exhibits the characteristics of both the ceramics which are mixed.

According to one known method, silicon carbide which is sintered at about 2000° C. and silicon nitride which is sintered in a temperature range from 1700° C. to 1850° C. are mixed together, and the mixture is sintered. The sintered composite ceramic comprises minute particles of silicon carbide which are dispersed in the matrix of silicon nitride. The composite ceramic has a high mechanical strength possessed by silicon nitride, but exhibits a low thermal conductivity of 0.04 cal/cm.-sec. ° C., which is much lower than the thermal conductivity of 0.07 cal/cm.sec. ° C. possessed by silicon nitride itself. It is known that if a composite ceramic is to have a high heat insulation capability so that it can be used as a material for a heat-insulated engine component, then zirconium oxide (hereinafter referred to as "zirconia") may be added.

According to another method, ceramic fibers of silicon carbide are impregnated with silicon nitride by chemical vapor impregnation (CVI), thereby producing composite ceramic fibers with a silicon nitride matrix.

With the this method, the dispersion of silicon carbide is based on the difference between the sintering temperatures of silicon carbide and silicon nitride. Because the sintering temperature of silicon nitride is lower than the sintering temperature of silicon carbide, when silicon nitride and silicon carbide are sintered together, particles of silicon carbide are trapped in particles of silicon nitride. As a result of applying this method, a composite ceramic material comprising a silicon nitride matrix with silicon carbide therein is produced.

Thus, according to this method the sintering temperature of the ceramic particles to be dispersed must be higher than that of the matrix ceramic, i.e., a ceramic whose sintering temperature is lower than the sintering temperature of a matrix ceramic. Accordingly, this process of making composite ceramic materials can not be applied to ceramics which have sintering temperatures than the sintering temperatures of the matrix materials cannot be dispersed in the matrix ceramic. For example, in conventional sintered composite ceramics of silicon nitride and zirconia since the sintering temperature of zirconia is lower than that of silicon nitride, zirconia exists in the grain boundary of silicon nitride and it is impossible to disperse fine particles of zirconia in a silicon nitride matris. The mechanical strength of the sintered mixture is thus much lower than that of a sintered body formed solely of silicon nitride because the grain boundary can be easily broken due to the presence of zirconia in the grain boundary. Although impossible by this method, in order to lower the thermal conductivity of silicon nitride while maintaining its mechanical strength, it would be better to disperse zirconia in particles of silicon nitride. A second process of manufacturing composite ceramics employs ceramic fibers of silicon carbon that are impregnated with silicon nitride by chemical vapor impregnation (CVI), so that the silicon carbide fibers are incorporated in a silicon nitride matrix.

This second method requires a long period of time to carry out its steps and is costly when applied to bulk ceramics. Therefore, the cost of a composite ceramic component produced by this method is high.

SUMMARY OF THE INVENTION

It is an object of the present invention to provide composite ceramics having high mechanical strength and which are good thermal insulators, so that they are suitable for use as high-temperatures structural materials for thermally insulated engine components and the like.

It is another object of the present invention to provide a composite ceramic material which comprises a solid dense sintered body composed of composite particles including a matrix of ceramic particles and particles of a different ceramic having a lower sintering temperature than that of the matrix ceramic, the particles of the different ceramic being dispersed in the matrix of ceramic particles, and a method of manufacturing such a composite ceramic material.

According to the present invention, there is provided a composite ceramic comprising a matrix of a first ceramic, and a plurality of particles of a second ceramic which has a sintering temperature lower than the sintering temperature of the first ceramic, the particles being dispersed in the matrix.

The composite ceramic is manufactured by pressing a mixture of particles of one of the elements of a first ceramic serving as a matrix and particles of a second ceramic which has a sintering temperature lower than the sintering temperature of the first ceramic, heating the pressed mixture in a gaseous atmosphere containing the other of the elements of the first ceramic to convert the material particles in the mixture into the first ceramic due to sinter reaction, thereby producing a preliminary sintered body, and sintering the preliminary sintered body at a higher temperature under a higher pressure than the temperature and pressure in the sinter reaction, reducing the volumes of interstices in the preliminary sintered body, thereby producing a dense sintered body as a composite ceramic.

The second ceramic has a thermal conductivity lower than the thermal conductivity of the first ceramic.

In a preferred method of manufacturing a composite ceramic according to the present invention the first ceramic is silicon nitride and the second ceramic is zirconium oxide. The zirconium oxide is stabilized or partially stabilized by one or a combination of 2–10% of magnesium oxide calcium oxide and yttrium oxide.

The particles of the dispersed ceramic may be stabilized or partially stabilized by including a stabilizer. For example, in the case where the dispersed ceramic is zirconia, the zirconia may be stabilized by adding one or a combination of 2-10% of magnesium oxide, calcium and yttrium oxide to the zirconia particles.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a table of the bending strengths and thermal conductivities of a inventive composite ceramic and comparative sintered bodies, the bending strengths being determined by the three-point bending test.

DETAILED DESCRIPTION OF THE PREFERRED EMBODIMENT

A method of manufacturing a composite ceramic material according to the present invention will be described with reference to FIGS. 1 through 3.

Figure 1:
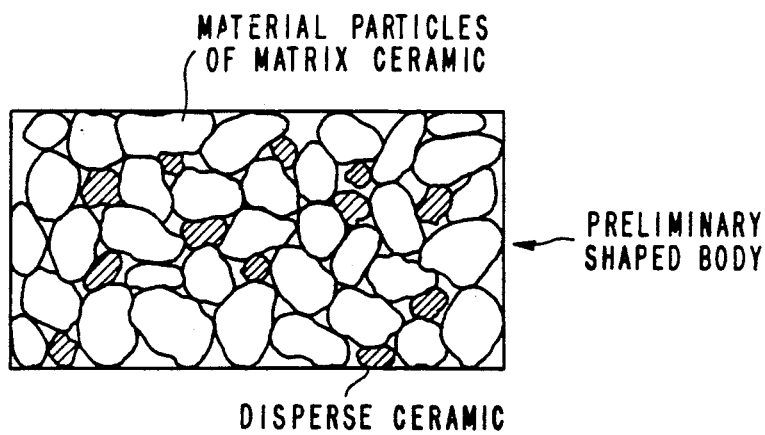
FIG. 1 is a schematic diagram showing the internal structure of a preliminary shaped body.

As shown in FIG. 1, material particles of one of the elements of a matrix ceramic and particles of a disperse ceramic whose sintering temperature is lower than that of the matrix ceramic are mixed together, and the mixture is pressed into a preliminary shaped body.

Figure 2:
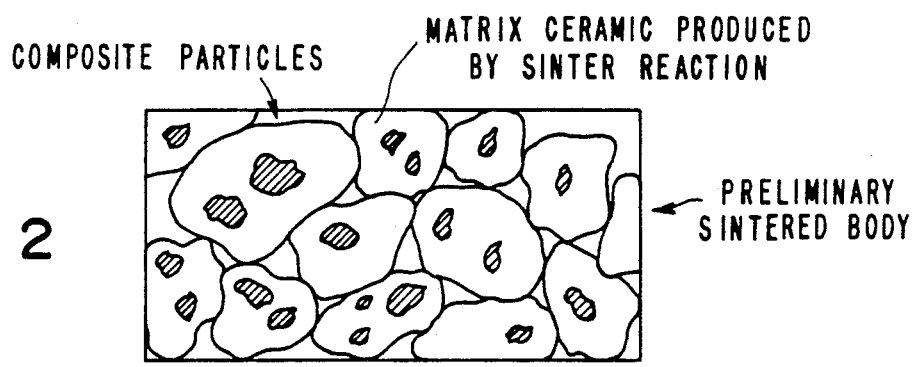
FIG. 2 is a schematic diagram showing the internal structure of a preliminary sintered body.

Then, as shown in FIG. 2, the preliminary shaped body is placed in a sinter reaction furnace, and the particles in the preliminary shaped body are subjected to sinter reaction in the sinter reaction furnace, thereby producing a preliminary sintered body in which the particles of the lower sintering temperature are dispersed in the matrix ceramic which is generated by the sinter reaction.

Figure 3:
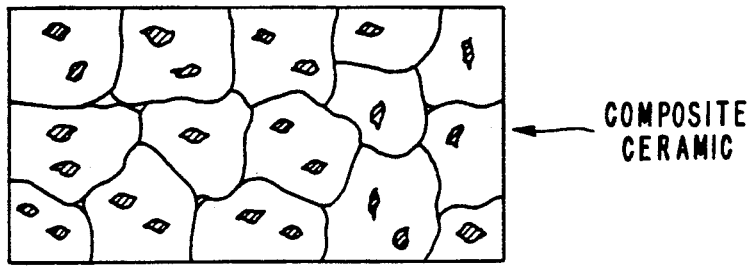
FIG. 3 is a schematic diagram showing the internal structure of a composite ceramic according to the present invention.

Thereafter, as shown in FIG. 3, the preliminary sintered body is fully sintered under the conditions in which the matrix ceramic would be sintered, so that a composite ceramic with a dense structure is produced.

The composite ceramic material which is produced according to the above method of the present invention is a dense sintered body composed of composite particles wherein the particles of the disperse ceramic, whose sintering temperature is lower than that of the matrix ceramic, are dispersed in the particles of the matrix ceramic. The composite ceramic material thus produced is inexpensive to manufacture, and exhibits the characteristics of both the matrix ceramic and the disperse ceramic.

INVENTIVE EXAMPLE

According to an Inventive Example, a matrix ceramic was silicon nitride ($Si_3N_4$) and a disperse ceramic was zirconia which was partially stabilized by magnesium oxide.

More specifically, 90 wt % of silicon (Si) powder, and 10 wt % of zirconia including 5 wt % of yttrium oxide as a sintering assistant and 3.3 wt % of magnesium oxide as a partial stabilizer were mixed in methanol according to a wet mixing process. Thereafter, the mixture was dried by a spray dryer in a stream of nitrogen gas, and granulated into granular powder.

The granular powder was then pressed into a shaped body having dimensions of 10×10×40 mm with a molding axial press. Then, the shaped body was pressed into a preliminary shaped body under 2 tons/cm² with a cold hydrostatic-pressure press (CIP).

The preliminary shaped body was then put in a sinter reaction furnace in which it was heated to 1400° C. in a nitrogen gas atmosphere. The particles of Si were converted to those of $Si_3N_4$ according to sinter reaction, so that a preliminary sintered body was produced. During the sinter reaction, the particles of zirconia powder were encased in the grown particles of $Si_3N_4$.

The preliminary sintered body was thereafter placed in a sintering furnace containing a nitrogen gas atmosphere, and sintered for 6 hours at 1750° C. Then, it was cooled down to 1400° C. at a rate of 400° C./h, and then down to 1100° C. at a rate of 75° /h, after which it was kept at 1100° C. for 20 hours and then cooled down to room temperature in the furnace. As a result, a sintered body A of a composite ceramic was produced.

In this final sintering process, the structure of the sintered body A was rendered dense, and the zirconia of the disperse particles was partially stabilized by the magnesium oxide, so that the toughness of the sintered body A was increased.

COMPARATIVE EXAMPLES

A preliminary sintered body, which was produced in the above inventive process, was used as a comparative sintered body B. In addition, a comparative sintered body C was prepared by employing $Si_3N_4$ powder instead of the Si powder in the Inventive Example, pressing the granular powder into a preliminary shaped body, and then directly fully sintering the preliminary shaped body in a sintering furnace.

The sintered bodies A, B, C were subjected to the three-point bending test. The measured bending strengths of these sintered bodies A, B, C and their thermal conductivities are shown in FIG. 4.

As shown in FIG. 4, the sintered body A according to Inventive Example has a lowest thermal conductivity and a highest mechanical strength. The thermal conductivity is low because the zirconia dispersed in the $Si_3N_4$ particles scatters the lattice vibration of $Si_3N_4$ due to thermal conduction. The mechanical strength is high since no zirconia is present in the grain boundary the bonding strength between the particles of $Si_3N_4$ is high.

The comparative sintered body B, which is a preliminary sintered body, is coarse in structure and hence does not have sufficient bonding strength between the $Si_3N_4$ particles, with the result that the mechanical strength thereof is low.

The comparative sintered body C is lower in mechanical strength than the sintered body A and its thermal conductivity is not lowered since zirconia is separated out in the grain boundary of $Si_3N_4$.

In the Inventive Example, the Si powder was employed. However, a mixture of Si powder and $Si_3N_4$ powder may be employed for a higher density. Aluminum oxide may be used instead of yttrium oxide as a sintering assistant. The preliminary sintered body may be fully sintered by the gas pressure sintering process, the hot pressing process, or the hot hydrostatic-pressure process (HIP). Zirconia may be partially stabilized by yttrium oxide or calcium oxide.

Although a certain preferred embodiment has been shown and described, it should be understood that many changes and modifications may be made therein without departing from the scope of the appended claims.

What is claimed is:

1. A method of manufacturing a composite ceramic, comprising the steps of:
   pressing a mixture of particles of silicon and particles of zirconium oxide;
   heating the pressed mixture in a gaseous atmosphere containing nitrogen to convert said silicon particles in the mixture into silicon nitride due to sinter reaction, thereby producing a preliminary sintered body; and
   sintering the preliminary sintered body at a higher temperature under a higher pressure than the temperature and pressure in the sinter reaction, reducing the volumes of interstices in the preliminary sintered body, thereby producing a dense sintered body as a composite ceramic.

2. A method according to claim 1, wherein said zirconium oxide is partially stabilized by magnesium oxide.

3. A method of manufacturing a composite ceramic, comprising the steps of:
   forming a mixture by mixing silicon particles and zirconium oxide particles, said zirconium oxide particles being stabilized by at least one of magnesium oxide, calcium oxide and yttrium oxide;
   converting said silicon particles into silicon nitride by reaction sintering at a first temperature said mixture in a gaseous atmosphere containing nitrogen, thereby forming a preliminary sintered body; and
   producing a dense sintered body by sintering said preliminary sintered body at a second temperature, said second temperature being higher than said first temperature.

4. A method as recited in claim 3, wherein said step of forming a mixture includes the sub-step of:
   adding 2-10 weight percent of at least one of magnesium oxide, calcium oxide and yttrium oxide to said zirconium oxide particles.

5. A method as recited in claim 3, wherein said first temperature is about 1400° C. and said second temperature is about 1750° C.

6. A method as recited in claim 3, wherein said step of forming a mixture includes the sub-step of:
   adding a sintering assistant selected from a group consisting of yttrium oxide and aluminum oxide.

7. A method as recited in claim 6, wherein said step of forming a mixture includes the sub-steps of:
   forming a wet mixture by mixing said silicon particles, said zirconium oxide particles, said sintering assistant and at least one of said magnesium oxide, calcium oxide and yttrium oxide in methanol;
   forming a dried mixture by drying said wet mixture; and
   forming a granular powder by granulating said dried mixture.

* * * * *

UNITED STATES PATENT AND TRADEMARK OFFICE
CERTIFICATE OF CORRECTION

PATENT NO. : 5,168,080
DATED : December 1, 1992
INVENTOR(S) : Shogo SUZUKI

It is certified that error appears in the above-identified patent and that said Letters Patent is hereby corrected as shown below:

Column 1, line 56, change "method" to --method,--; and
          line 60, after "ceramic" insert --cannot be dispersed in the matrix ceramic. Particles that can be dispersed in the matrix are limited to those which are sintered at higher temperatures than the sintering temperatures of the matrix materials--.

Column 2, line 2, change "matris" to --matrix--; and
          line 65, after "magnesium oxide" insert --,--.

Column 3, line 20, change "a" to --an--.

Signed and Sealed this

Eighteenth Day of January, 1994

BRUCE LEHMAN

Attest:

Attesting Officer

Commissioner of Patents and Trademarks